(12) United States Patent
Kettley et al.

(10) Patent No.: US 6,754,842 B2
(45) Date of Patent: Jun. 22, 2004

(54) FACILITATING A RESTART OPERATION WITHIN A DATA PROCESSING SYSTEM

(75) Inventors: Paul Kettley, Winchester (GB); Peter Siddall, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 09/790,415

(22) Filed: Feb. 21, 2001

(65) Prior Publication Data

US 2001/0047495 A1 Nov. 29, 2001

Related U.S. Application Data

(60) Provisional application No. 60/183,861, filed on Feb. 22, 2000.

(51) Int. Cl.[7] .................................................. G06F 11/00
(52) U.S. Cl. .............................. 714/2; 714/15; 714/23; 707/202
(58) Field of Search ............................... 714/2, 15, 23; 707/202

(56) References Cited

U.S. PATENT DOCUMENTS

| | | | | |
|---|---|---|---|---|
| 5,381,545 A | * | 1/1995 | Baker et al. ................... | 714/19 |
| 5,649,088 A | * | 7/1997 | Hauck et al. ................... | 714/2 |
| 5,764,877 A | * | 6/1998 | Lomet et al. ................... | 714/6 |
| 5,974,425 A | * | 10/1999 | Obermarck et al. ......... | 707/202 |
| 6,351,754 B1 | * | 2/2002 | Bridge et al. ................ | 707/202 |
| 6,411,969 B1 | * | 6/2002 | Tam ............................ | 707/204 |
| 6,460,051 B1 | * | 10/2002 | LaRue et al. ................ | 707/201 |
| 6,594,774 B1 | * | 7/2003 | Chapman et al. .............. | 714/2 |
| 6,594,781 B1 | * | 7/2003 | Komasaka et al. ........... | 714/19 |

* cited by examiner

*Primary Examiner*—Scott Baderman
*Assistant Examiner*—Anne L. Damiano
(74) *Attorney, Agent, or Firm*—Winstead, Sechrest & Minick PC; John D. Flynn

(57) ABSTRACT

The invention provides a restart mechanism within a data processing system for restarts following a failure. The mechanism is provided in persistent storage as a recovery log containing recovery log records which can be used during recovery from the failure of the data processing system. The log records relate to units of work undertaken by the data processing system, and the mechanism retrieves, from the recovery log, a recovery log record relating to a unit of work, determines whether or not the unit of work meets at least one predetermined criterion, and performs a recovery process if the unit of work meets the predetermined criterion.

22 Claims, 4 Drawing Sheets

FACILITATING A RESTART OPERATION WITHIN A DATA PROCESSING SYSTEM

CROSS REFERENCE TO RELATED APPLICATION

This application claims priority and all other benefits under 35 U.S.C. §120 of prior filed co-pending U.S. patent application serial No. 60/183,861, filed Feb. 22, 2000 and is incorporated herein by reference thereto.

FIELD OF THE INVENTION

The invention relates to the field of data processing and, more particularly, to a data processing system and method to allow a restart following a system failure.

BACKGROUND OF THE INVENTION

In the operation of a data processing system such as, for example, running IBM's OS/390™ operating system available from International Business Machines Corporation, one or more resource managers are provided to manage the resources of the data processing system. The resources may include, for example, both volatile and non-volatile storage, such as, online memory and direct access storage device (DASD) storage, as well as resource managers such as, for example, queue managers and data base managers, which perform insert, delete, increment and decrement operations. Conventionally such resource managers or systems are provided with a recovery log to store information needed to facilitate a restart of a resource manager in the event of a failure relating to the computer systems. It will be appreciated that such a failure may relate to a loss of power or the failure of a hardware device such as on board memory or a DASD holding a database.

U.S. Pat. No. 4,648,031 illustrates that it is known to write at specific operating points, a recovery log that is stored in non-volatile storage. Conventionally, the recovery log comprises a chronological record of processing events that have occurred within the data processing system and, typically, identify the units of work that have been undertaken by the data processing system. A Queue manager contains a recovery manager which is provided to co-ordinate a number of recovery operations which include the recovery of log records from the recovery log which are required for effecting a re-start.

Conventionally, a restart comprises a series of phases, which include a first phase commonly referred to as a status re-build phase. During the status rebuild phase, the status of incomplete units of work is established, a forward log range of the recovery log that must be traversed is established, a backward log range of the recovery log is also established together with a starting point for media recovery.

During a second phase, commonly known as a forward recovery phase, the recovery log is traversed forward from the starting point established during the status re-build phase to the tail end of the recovery log. During a third phase, conventionally known as a backward recovery phase, the recovery log is traversed backward to the starting point established in the status re-build phase from the tail end of the log.

During the forward and backward traversals, appropriate action is taken to render, for example, queues in a transaction consistent status, that is, the queues are recovered to a known condition. Any such action for a unit of work is known as a recovery process.

It will be appreciated that the lapsed time taken to effect a restart and the speed of restart processing is important to any business. For example, if the re-start of a database takes one hour, then that resource, which may be an insurance database, is not available for that hour and business cannot be conducted using the unavailable database.

In some circumstances the most significant restart variable in a transaction processing system is the time spent processing log information to provide transaction consistency and data integrity after a restart has been completed. Furthermore it will be appreciated that the introduction of old data files into a resource manager for a restart will require that these data files undergo media recovery operations, and incomplete units of work will need to be recovered or completed as part of the restart operation.

It will be appreciated that if one or more units of work during a restart operation are encountered that have been in progress for a relatively long period of time, such as, for example at least a day or two and, to take an even worse example, perhaps at least a week, the restart operation can result in the forward and backward recovery times being considerable.

For example, if it is discovered during a restart that there is a single incomplete unit of work that has been indoubt for two weeks, it can be appreciated that the restart process will take a considerable period of time, or, in the worst case, a restart using that pending unit of work may not be possible as the required log data may not be available. Conventionally, during the restart process, all log records relating to the indoubt unit of work would have to be read during forward recovery to lock the incomplete updates defined by the unit of work which prevents access to the data until the unit of work has been committed. If a unit of work is, as in this example, a number of weeks old, then prior log records for that unit of work may have been archived in off-line storage. The need to re-load and access such archived log records will further exacerbate restart time. Once the archived log records have been loaded, since they are typically stored on tape, the restart time may still take several hours since the log records must be read in a serial fashion.

If a single unit of work has been incomplete for two weeks and has a status of Inflight, again restart may take a considerable period of time, that is, restart may involve an extended backward recovery phase, or a restart may not be possible. During the restart process, all log records relating to the Inflight unit of work will have to be read during backward recovery to back out all of the updates defined by that unit of work. Again, as described above in relation to extended forward recovery times, there may be a need to retrieve old log records from an archive that is stored on magnetic tape.

It is an object of the present invention to mitigate at least some of the problems of the prior art.

SUMMARY OF THE INVENTION

Accordingly, a first aspect of the present invention provides a data processing method for a data processing system having a recovery log storing log records that can be used during recovery from a failure of the data processing system, the method comprising the steps of:

retrieving a unit of work from the recovery log;

determining whether or not the unit of work meets at least one predetermined criterion; and removing the unit of work from the recovery log if the unit of work met the predetermined criterion.

Preferably, an embodiment is provided in which the predetermined criterion relates to the age of the unit of work.

Whether or not a unit of work is removed from a recovery log may depend upon that unit of work meeting a further criterion. Suitably, an embodiment provides a method further comprising the step of outputting a message relating to the unit of work requesting an indication of any preferred course of action for that unit of work; and receiving an input identifying the preferred course of action in relation to that unit of work.

It will be appreciated that the above step of outputting may output the message to a display device and solicit input from a user or message may be output to a message queue to solicit a response from an application.

Accordingly, a first aspect of the present invention provides a data processing method for facilitating a restart within a data processing system following a failure, the data processing system comprising, within persistent storage, a recovery log containing recovery log records which can be used during recovery from the failure of the data processing system, the log records relating to units of work undertaken by the data processing system, the method comprising the steps of:

retrieving, from the recovery log, a recovery log record relating to a unit of work;

determining whether or not the unit of work meets at least one predetermined criterion; and performing a recovery process if the unit of work meets the predetermined criterion.

As recognised above, a significant problem associated with restart, that is, recovery from a failure, are units of work that have been incomplete or performing update activities that span a significant period of time. Suitably, an embodiment preferably provides a method in which the step of determining whether or not the unit of work meets the at least one predetermined criterion comprises the step of comparing the age of the unit of work with a threshold value.

Preferably, an embodiment provides a method in which the step of determining comprises the step of concluding that the unit of work meets the predetermined criterion if the age of the unit of work does not exceed the threshold value.

Alternatively or additionally, embodiments may comprise a method in which the step of determining comprises the step of concluding that the unit of work meets the predetermined criterion if the age of the unit of work exceeds the threshold value.

Once a unit of work has been identified as being problematical, action should be taken in relation to that unit of work to mitigate any potential adverse effects that unit of work may have on the recovery process.

Suitably, embodiments provide a method in which the step of determining comprises the steps of outputting a message comprising data relating to the unit of work; and receiving a response to the message which provides an indication of further processing to be undertaken in relation to the unit of work.

Preferably, embodiments provide a method in which the step of outputting a message comprises the step of outputting the message in a human-readable form and soliciting input of a preferred action to be performed in relation to the unit of work during the recovery process.

Alternatively or additionally, embodiments may comprise a method in which the step of outputting a message comprises the step of communicating data relating to the unit of work to an application for assessing at least one metric associated with the unit of work; and receiving a response from the application which provides an indication of a preferred action to be performed in relation to the unit of work during the recovery process.

Preferably, an embodiment provides a method in which the step of performing the recovery process comprises the step of effecting a predetermined action in relation to the unit of work. A preferred embodiment provides a method in which the step of effecting a predetermined action in relation to the unit of work comprises the step of forcing a commit operation in relation to the unit of work.

An alternative to creating a separate restart recovery log is afforded by embodiments that provide a method in which the predetermined action comprises removing the unit of work from the recovery log and in which the step of performing the predetermined recovery action comprises the step of performing a recovery action in relation to the recovery log having had at least the unit of work removed.

Embodiments provide a method in which the step of determining whether or not the unit or work meets a predetermined criterion comprises the step of determining whether the unit of work was pending at the time of the failure.

Preferably, embodiments may provide a method in which the step of performing the recovery process comprises the step of completing the unit of work. A preferred embodiment provides a method in which the step of performing the predetermined recovery process comprises the step of effecting a commit for the unit of work.

Advantageously, the removal of selected units of work from the recovery log allows the restart time to be significantly reduced. Preferably, the unit of work that meets the predetermined criterion undergoes a forced commit operation, that is, the unit of work is deemed to have been committed even though the unit of work may comprise updates that have yet to be completed.

A second aspect of the present invention provides a data processing system for facilitating a restart following a failure, the data processing system comprising, within persistent storage, a recovery log containing recovery log records which can be used during recovery from the failure of the data processing system, the log records relating to units of work undertaken by the data processing system;

means for retrieving, from the recovery log, a recovery log record relating to a unit of work;

means for determining whether or not the unit of work meets at least one predetermined criterion; and means for performing a recovery process if the unit of work meets the predetermined criterion.

A third aspect of the present invention provides a computer program product for facilitating a restart following a failure within a data processing system, the data processing system comprising, within persistent storage, a recovery log containing recovery log records which can be used during recovery from the failure of the data processing system, the log records relating to units of work undertaken by the data processing system; computer program product comprises a computer readable storage medium having embodied thereon:

means for retrieving, from the recovery log, a recovery log record relating to a unit of work;

means for determining whether or not the unit of work meets at least one predetermined criterion; and means for performing a recovery process if the unit of work meets the predetermined criterion.

Other inventive aspects of the embodiments of the present invention are defined in the appended claims.

A further aspect of the present invention provides a data processing method for a data processing system comprising a recovery log containing recovery log records relating to a plurality of units of work which have influenced a system resource of the data processing system, the method comprising the steps of retrieving a recovery log record from the recovery log, assessing the unit of work associated with the recovery log to determine, whether or not a recovery process corresponding to the unit of work should be performed in relation to the system resource; and performing the recovery process in relation to the system resource in accordance with the unit of work if the assessment does not indicate that the recovery process should not be performed; or omitting to perform the recovery process in relation to the system resource if the assessment indicates that recovery process should not be performed.

Preferably, an embodiment further provides a method in which the step of assessing comprises the step of comparing at least one metric of the unit of work with at least one threshold value.

Still further embodiments provide a method in which the step of assessing further comprises the step of concluding that the recovery process should be performed if the metric of the unit of work does not exceed the threshold value. Alternatively, embodiments provides a method in which the step of assessing further comprises the step of concluding that the recovery process should not be performed if the metric of the unit of work exceeds the threshold value.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENTS

Figure 1:
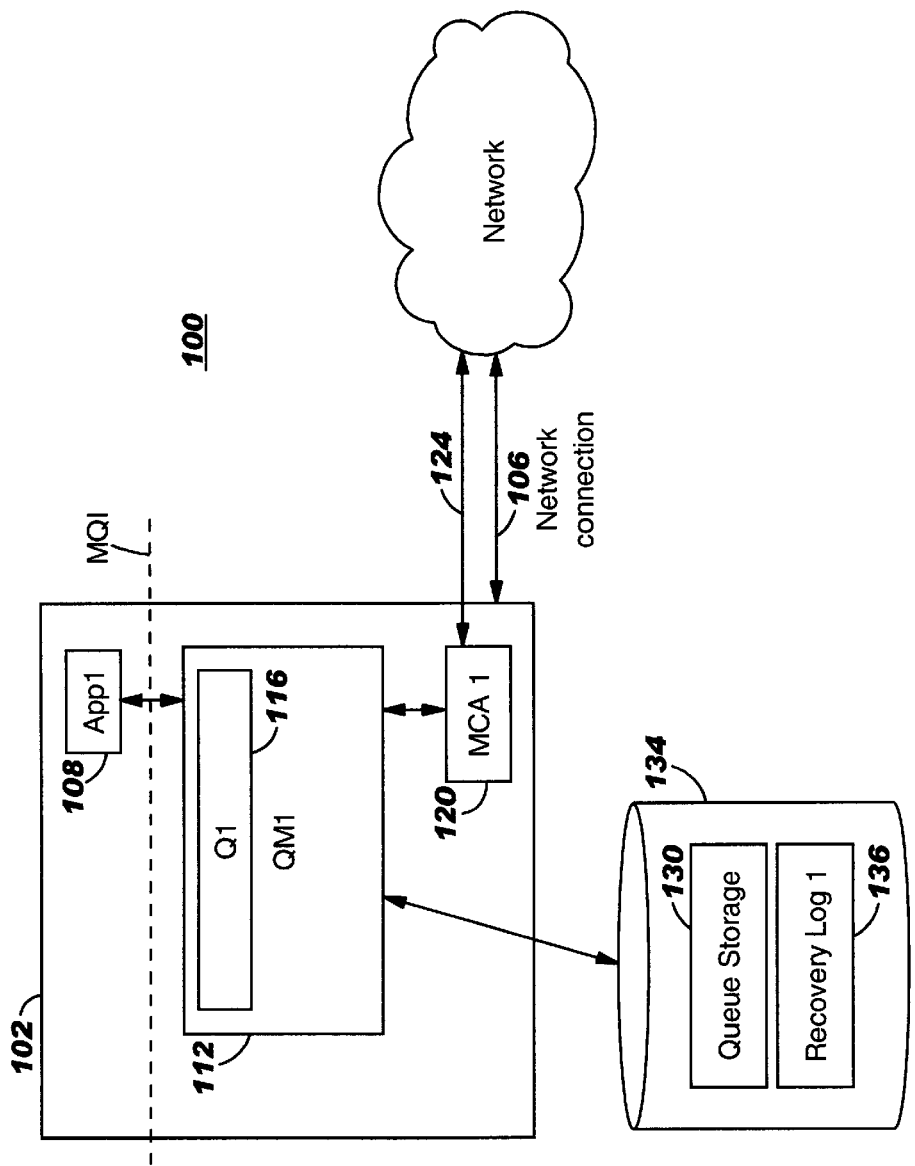
FIG. 1 illustrates a data processing system running MQSeries within which the embodiments of the present invention may be realized.

Referring to FIG. 1 there is shown a data processing system 100 comprising, for example, an IBM System 390 computer 102 running IBM s OS/390 operating system linked to a communication network via a physical communication link 106. The physical communication link 106 is used to support logical communication links between a first application 108 and, for example, a second application (not shown) running on the first data processing system 102 and a second data processing system 104 (not shown) respectively. Preferably, the first data processing system 102 is running MQSeries for OS/390 available from International Business Machines Corporation. As will be appreciated by those skilled in the art, the communication between the applications is effected using a resource manager that is commonly known as a queue manager 112. The queue manager 112 comprises at least one queue 116 into which and from which the application 108 can place messages to be communicated to or that have been received from a further application. The transmission and receipt of messages is conventionally implemented using a message channel agent such as message channel agent 120 that communicates using a logical communication channel 124 which is supported by the physical connection 106. The first data processing system 102 comprises persistent storage 134 which contains a recovery log 138 to allow recovery of the queues system to an atomic or transaction consistent state in the event of failure of any aspect of the system that adversely effects the status of the queue 116.

During normal operation the queue resource manager controls units of work that effect operations, such as, for example inserting record data into queue storage 130, deleting records from a queue storage or updating queue storage records. In the event of an interruption to normal processing operations, the queue storage 130 may be left in an inconsistent state. Furthermore, it will be appreciated that an interruption to the normal processing undertaken by the first queue manager 112 may, in a distributed database system adversely effect operations performed by a second queue manager (not shown) and cause the second queue manager to suspend operations until normal processing is resumed by the first queue manager 112. To facilitate a restart from an interruption to normal processing, as described above, the queue manager 112 uses recovery log records stored within the recovery log 138 to re-establish normal processing operations, that is, to render the queue 116 in a transaction consistent or atomic state.

Units of work that have not been completed, that is, that have not yet been committed or aborted, are described as Inflight, inabort, indoubt or incommit.

An inflight unit of work is a unit of work that is started, effected updates to some resources and for which no decision has been made to complete or commit the updates.

An inabort unit of work is a unit of work that has been started, some updates to resources have been effected and a decision has been taken to reverse the updates but a reversal of the updates has not been completed.

An indoubt unit of work is a unit of work that has been started, updates have been effected to resources and the resources to be updated by this unit of work involve at least one other resource manager which has not provided an indication that the unit of work can be completed.

An incommit unit of work is a unit of work that has been started, updates to resources have been effected and a decision has been made to commit all of the updates but not all of the updated resources have been made available as is conventional after a commit operation.

The recovery log containing the recovery log records (not shown) is said to be either persistent or non-persistent. Preferably, the queue storage 130 relates to messages contained within the message queue 116 as are known within the MQSeries products of International Business Machines Corporation. In the event of system failure the message conventionally stored within such a queue must be recoverable. A message is persistent if it can survive a queue manager or system restart.

Figure 2:
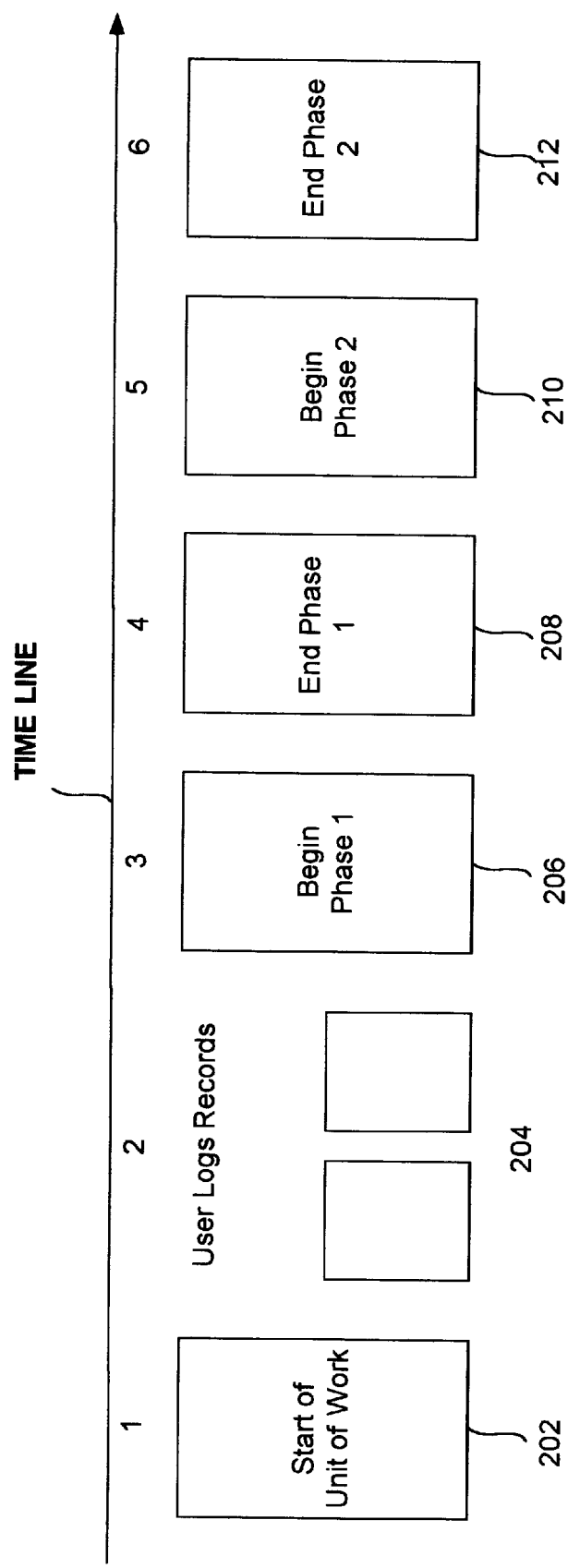
FIG. 2 depicts the phases of writing a recovery log.

Referring to FIG. 2 there is shown the stages in which a unit of work progresses and the relationship of that progress to the recovery log records in the recovery log 138. In the first state 202 a begin unit of work log record is entered when a unit of work is commenced. The entry is effected as soon as an application such as the first application 108 influences or utilizes a recoverable resource such as the database, queue or file. At this stage the unit of work is said to be inflight and it is not known if the unit of work will commit or abort. In a second state 204 log records relating to resource updates are written. The application 108 can perform many updates in relation to resources and these updates are captured in the recovery log 138. At this stage 204 the unit of work is still said to be inflight and it is not known if all updates of the unit of work will complete successfully. If the application that created the unit of work terminated abnormally at this stage or if the application requested a rollback of all updates, the unit of work would be reversed to an inabort unit of work and all updates effected thus far would be reversed. When the abort processing has been completed, the queue is in the transaction consistent stage it was in before the unit of work was commenced.

The third stage 206 is reached if the application does not request a rollback or does not terminate abnormally during the second stage 204. In the third stage 206, a begin phase 1 log record is written to the recovery log 138. The application is deemed to have reached a point in processing where all updates should be committed to make those updates visible to other users or applications. Hence the application requests a commit operation for all of its updates, that is, a sync point command is issued. A begin commit phase 1 log record (not shown) is written to the recovery log 138 which indicates the start of commit processing but does not guarantee that commit processing will be completed. At this stage 206, the unit of work is still said to be an inflight unit of work.

Within the fourth stage 208 the queue manager writes an end phase one log record in the recovery log 138. The end phase one log record is forced to the recovery log and if there is a system failure at this point, the state of this unit of work will be determined from this last log record. Within the fourth stage 208, the unit of work is said to be prepared or indoubt and it is not known if the unit of work will successfully complete until the queue manager 112 issues a commit or abort command for the unit of work on the instruction of a sync point co-ordinator (not shown). In the fifth stage 210, the queue manager writes a begin phase 2 log record (not shown) to the recovery log 138. This log record is forced to the recovery log 138. If there is a system failure at this point, the state of the unit of work will be determined from this last log record. At this stage, the unit of work is said to be in an incommit state and it is known that the unit of work will successfully complete in the near future. During a sixth stage 212 the queue manager 112 writes an end phase 2 log record (not shown) to the recovery log 138. At this stage the unit of work is deemed to have been completed and is no longer active.

Figure 3:
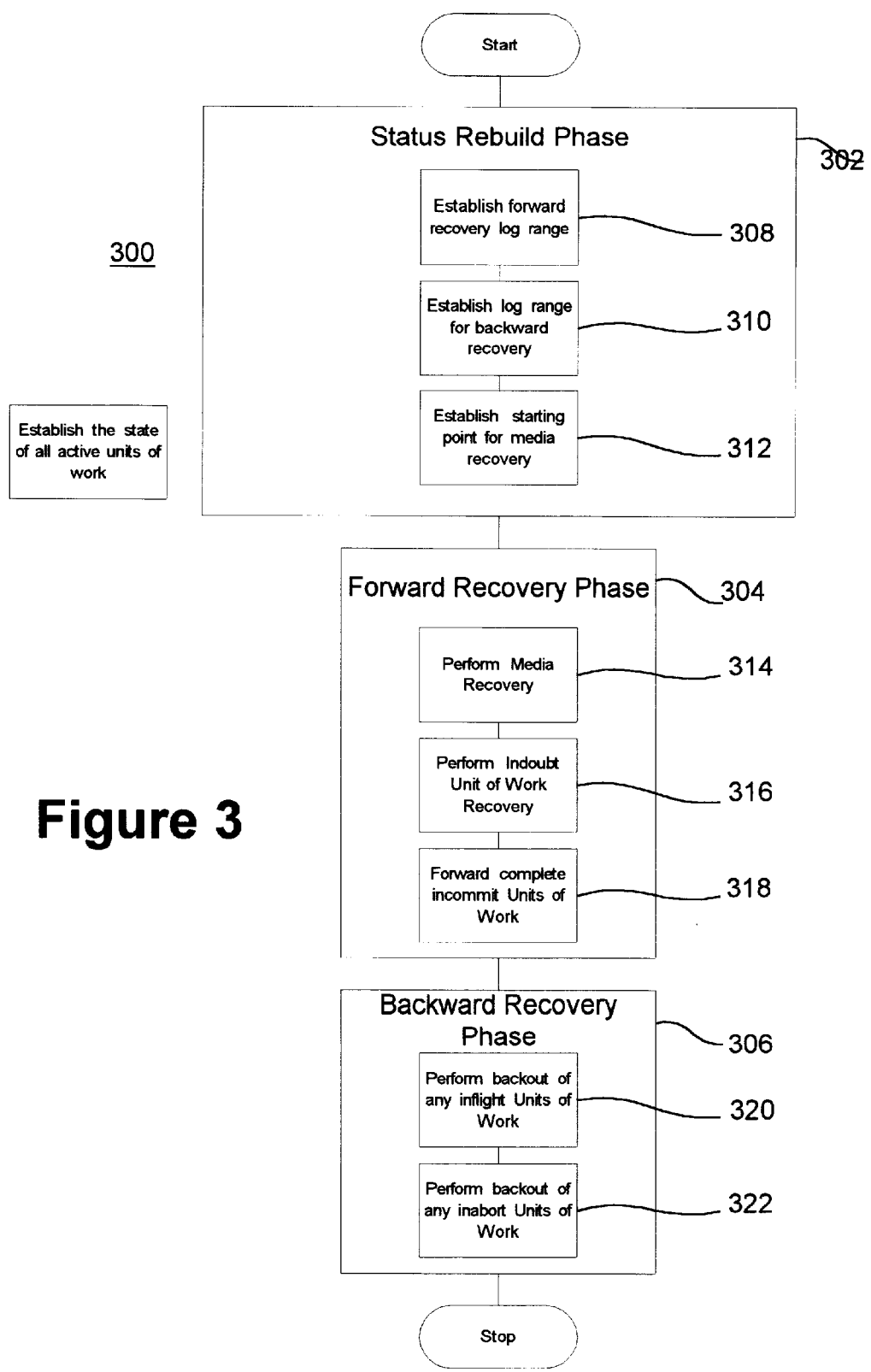
FIG. 3 shows a flow chart which illustrates the operations performed during a recovery from a failure.

Referring to FIG. 3, there is shown a flow chart 300 of the processing undertaken by the recovery manager contained with the queue manager 112 following an interruption to normal processing operations. The recovery or restart process comprises 3 basic phases; namely the status rebuild phase 302, a forward recovery phase 304 and a backward recovery phase 306. Within each of the phases 302 to 306, various operations are performed that are pertinent to that phase.

The recovery manager of the queue manager 112 is arranged to enter the status rebuild phase 302 to establish the state of all currently active units of work, that is, it is determined whether the units of work are inflight, incommit, inabort or indoubt, by reading the recovery log 138. The recovery manager (not shown) establishes, at step 308, the log range that must be processed for forward recovery. The log range that must be processed for backward recovery is established at step 310 and the starting point for recovery is established at step 312.

Conventionally, during the forward recovery phase 304, comprises, at step 314, media recovery. Step 316 shows indoubt recovery in which, subject to the modifications described hereafter in relation to the first embodiment, all old indoubt units of work are read in ascending order of an associated key. All indoubt units of work identified within the recovery log are processed at step 316 such that, subject to the modifications described below with reference to FIG. 4, indoubt units of work are locked and marked for further processing. In step 318 incommit units of work are completed.

The backward recovery phase 306 comprises first step 320 in which back out of any inflight units of work is performed. The second step, 322, backs out any inabort units of work.

Although the flowchart 300 shows, for example, forward operations being performed before backward operations, the embodiments of the present invention are not limited thereto. It will be appreciated that embodiments can equally well be realised in which the forward and backward operations are performed in some other order.

At the end of the above conventional processing for a restart and subsequent recovery of a system failure, the resources, such as the queue 116 should be in a transaction consistent or an atomic transaction state.

Figure 4:
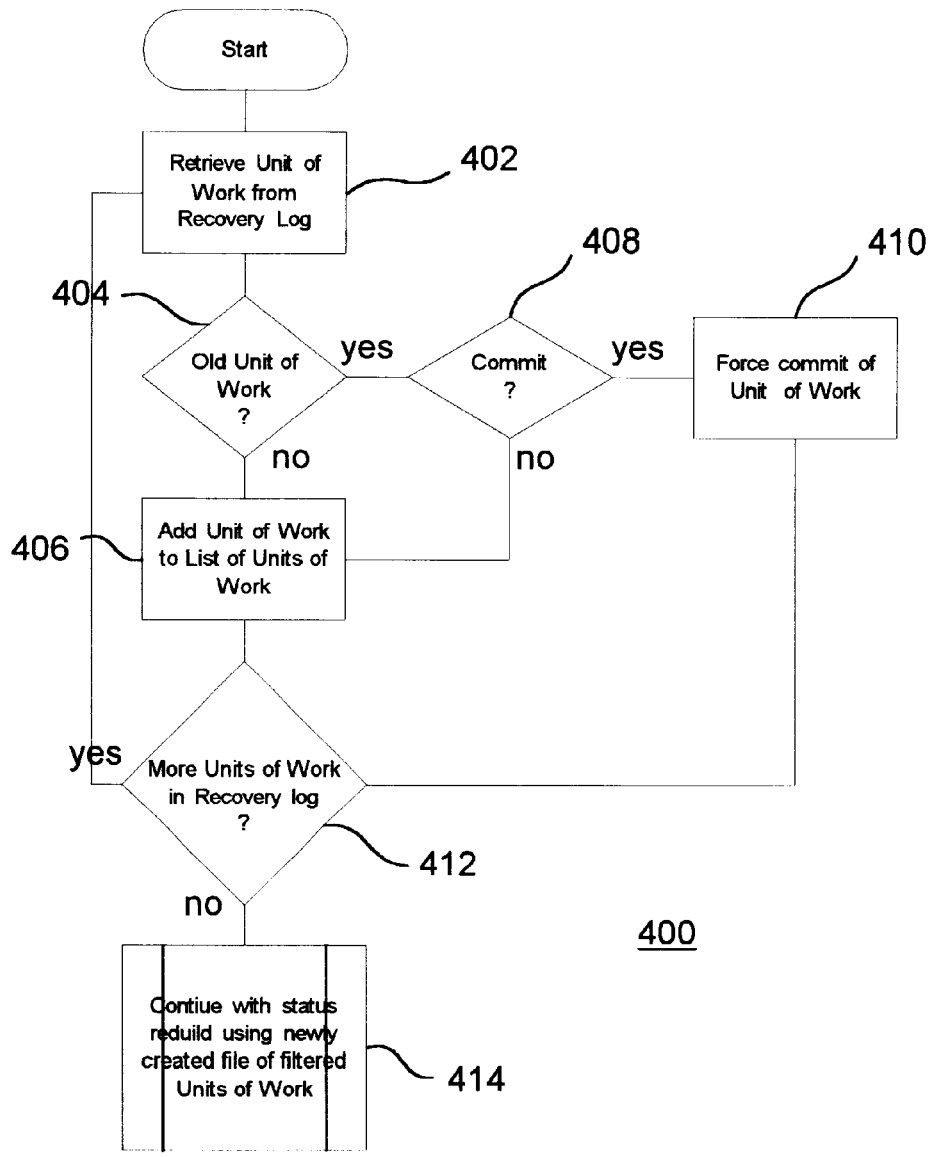
FIG. 4 illustrates a flow chart according to an embodiment for reducing restart recovery times.

Referring to FIG. 4, there is shown a flow chart 400 of a first embodiment. The processing shown in FIG. 4 relates to pre-processing of the recovery log to filter units of work that are, for example, too old and which may significantly adversely affect the restart or recovery time. At step 402 a recovery log record for a corresponding unit of work is retrieved from a recovery log, such as recovery log 138. It is determined at step 404 whether the unit of work corresponding to the retrieved recovery log record (not shown) meets a pre-determined criterion. In a preferred embodiment, the pre-determined criterion relates to the age of the unit of work. If the unit of work has an age that is greater than a pre-determined threshold, the unit of work is deemed to meet the pre-determined criterion.

If it is determined at step 404 that the unit of work does not meet the pre-determined criterion, the unit of work is added to a newly created list of units of work, at step 406 which will be used during the status re-build, forward recovery and backward recovery phases of a restart in conjunction with the recovery log 138. However, if it was determined at step 404 that the unit of work does meet the pre-determined criterion, it is determined at step 408 whether or not that unit of work should be subject to a forced commit operation. The decision whether or not the unit of work should be subjected to a forced commit operation is, preferably, taken by a system administrator or user and is effected by outputting a message requesting an indication from the administrator or user of the preferred further processing for this unit of work together with details of the unit of work. The administrator or user then responds to the request as appropriate having determined whether or not the unit of work would significantly delay or increase the restart recovery time. If the user determines that the unit of work would significantly delay or increase the restart recovery time, the user instructs the system to perform the forced commit operation in relation to the unit of work. However, if, having assessed the unit of work, the user determines that the unit of work will not significantly effect adversely the restart recovery time, the user indicates to a system that a forced commit operation should not be effected in relation to the unit of work.

If it was determined at step 408 that a forced commit operation should be effected in relation to the unit of work, that commit operation is performed at step 410. However, if it was determined at step 408 that the unit of work should not be subjected to a forced commit operation, the unit of work is added to the newly created list of units of work at step 406.

After the unit of work has been subjected to a forced commit operation at step 410, processing proceeds to step 412.

At step 412 it is determined whether or not the recovery log comprises further recovery log records and associated units of work. If the determination is positive, control passes to step 402 where the above-described process is repeated. However, if there are no further recovery log records within the recovery log, processing resumes at step 414 with the status rebuild phase 302, and, more particularly at step 308, of the above described recovery process shown in FIG. 3.

However, the process shown in FIG. 3 is, in the first embodiment, subject to the following variations to take into account the forced commit operation that has been effected in relation to selected units of work. In particular, if a force commit operation was performed in relation to a unit of work that met the pre-determined criterion which had a status of indoubt, the conventional traversal of the recovery log file during the forward phase of restart recovery to re-acquire serialization of the indoubt resources does not have to be performed. Furthermore, if the old unit of work that met the predetermined criterion was an inflight or inabort unit of work, the conventional traversal of the recovery log during the backward phase of restart recovery to back out logical operations associated with that unit of work does not have to be performed.

It will be appreciated from the above that the decision as to whether or not to perform a force commit operation in relation to a unit of work is taken by a system administrator. However, embodiments can be realised in which the output message is a conventional message that is placed in a message queue and the decision is taken by software that has been specifically arranged for examining the recovery log to determine whether or not that unit of work meets at least one pre-determined criterion. Since the decision to perform such a forced commit operation may involve balancing competing interests, it will be appreciated that the processing undertaken by an application charged with making such a decision may involve comparing the status of the unit of work, with a number of pre-determined criteria. Having undertaken that comparison, the application can send a reply message to the resource manager indicating whether or not a forced commit operation should be performed.

Advantageously, the embodiments of the present invention allow an administrator to take a business decision to commit a unit of work and thereby reduce restart times rather than waiting for restart recovery to process potentially large volumes of logged data. The embodiment afford the opportunity, when a single unit of work, or a number of old units of work, will potentially delay the restart process, of removing such offending unit of work or offending units of work. In effect, the recovery or restart time, without taking advantage of the present invention, would be greater than a recovery or restart time within a data processing system that did implement an embodiment of the invention. Taking a decision in relation to a unit of work that is incomplete and not performing any further updates relating to that unit of work, in effect, treating the unit of work as having been committed, notwithstanding the unit of work comprising further possibly updates, allows that unit of work to be removed from the recovery or restart process. Therefore, the recovery or restart process is reduced accordingly.

Although the above embodiments have used the age of a unit of work as the basis for determining whether or not a recovery process should be undertaken for that unit of work, the present invention is not limited thereto. Embodiments can be realised in which other metrics may be used as a basis for deciding whether a corresponding recovery process should be performed for a unit of work. Examples of other metrics may include, for example, a list of the resources touched by the unit of work, the number of updates performed, the number of record logs spanned by a unit of work, the category of the unit of work, the importance of the unit of work to a business process.

What is claimed is:

1. A data processing method for facilitating a restart within a data processing system following a failure, the data processing system comprising, within persistent storage, a recovery log containing recovery log records which can be used during recovery from the failure of the data processing system, the log records relating to units of work undertaken by the data processing system, the method comprising the steps of:

retrieving, from the recovery log, a recovery log record relating to a unit of work;

determining whether or not the unit of work meets at least one predetermined criterion; and performing a recovery process if the unit of work meets the predetermined criterion, in which the step of performing the recovery process comprises the step of deleting from the recovery log all units of work that do not meet the predetermined criterion; and performing a further recovery process in relation to the units of work of the updated recovery log.

2. A method as claimed in claim 1 in which the step of determining whether or not the unit of work meets the at least one predetermined criterion comprises the step of comparing at least one metric of the unit of work with at least one threshold value.

3. A method as claimed in claim 2 in which the step of determining comprises the step of concluding that the unit of work meets the predetermined criterion if the metric of the unit of work does not exceed the threshold value.

4. A method as claimed in claim 2 in which the step of determining comprises the step of concluding that the unit of work meets the predetermined criterion if the metric of the unit of work exceeds the threshold value.

5. A method as claimed in claim 1 in which the step of determining comprises the steps of outputting a message comprising data relating to the unit of work; and receiving a response to the message which provides an indication of further processing to be undertaken in relation to the unit of work.

6. A method as claimed in claim 5 in which the step of outputting a message comprises the step of outputting the message in a human-readable form comprising information relating to at least one metric of the unit of work and soliciting input of a preferred action to be performed in relation to the unit of work during the recovery process.

7. A method as claimed in claim 5 in which the step of outputting a message comprises the step of communicating data relating to the unit of work to an application for assessing at least one metric associated with the unit of work; and receiving a response from the application which provides an indication of a preferred action to be performed in relation to the unit of work during the recovery process.

8. A method as claimed in claim 1 in which the step of performing the recovery process comprises the step of effecting a predetermined action in relation to the unit of work.

9. A method as claimed in claim 8 in which the step of effecting a predetermined action in relation to the unit of work comprises the step of forcing a commit operation in relation to the unit of work.

10. A method as claimed in claim 1 in which the step of performing the recovery process comprises the step of completing the unit of work.

11. A method as claimed in claim 1 in which the step of performing the predetermined recovery process comprises the step of effecting a commit for the unit of work.

12. A data processing system for facilitating a restart following a failure, the data processing system comprising, within persistent storage, a recovery log containing recovery log records which can be used during recovery from the failure of the data processing system, the log records relating to units of work undertaken by the data processing system;

means for retrieving, from the recovery log, a recovery log record relating to a unit of work;

means for determining whether or not the unit of work meets at least one predetermined criterion; and means for performing a recovery process if the unit of work meets the predetermined criterion, in which the means for performing the predetermined recovery process comprises means for writing to a restart recovery log all units of work that do not meet the predetermined criterion and means for performing the recovery process in relation to the restart recovery log.

13. A system as claimed in claim 12 in which the means for determining whether or not the unit of work meets the at least one predetermined criterion comprises the step of comparing at least one metric of the unit of work with at least one threshold value.

14. A system as claimed in claim 13 in which the means for determining comprises means for concluding that the unit of work meets the predetermined criterion if the metric of the unit of work does not exceed the threshold value.

15. A system as claimed in claim 13 in which the means for determining comprises means for concluding that the unit of work meets the predetermined criterion if the metric of the unit of work exceeds the threshold value.

16. A system as claimed in claim 12 in which the means for determining comprises means for outputting a message comprising data relating to the unit of work; and means for receiving a response to the message which provides an indication of further processing to be undertaken in relation to the unit of work.

17. A system as claimed in claim 16 in which the means for outputting a message comprises the step of outputting the message in a human-readable form comprising information relating to a metric of the unit of work and means for soliciting input of a preferred action to be performed in relation to the unit of work during the recovery process.

18. A system as claimed in claim 16 in which the means for outputting a message comprises means for communicating data relating to the unit of work to an application for assessing at least one metric associated with the unit of work; and means for receiving a response from the application which provides an indication of a preferred action to be performed in relation to the unit of work during the recovery process.

19. A system as claimed claim 12 in which the means for performing the recovery process comprises means for effecting a predetermined action in relation to the unit of work.

20. A system as claimed in claim 19 in which the means for effecting a predetermined action comprises means for forcing a commit operation in relation to the unit of work.

21. A system as claimed in claim 12 in which the means for performing the predetermined recovery process comprises means for completing the unit of work.

22. A system as claimed in claim 12 in which the means for performing the predetermined recovery process comprises means for effecting a commit for the unit of work.

* * * * *